(12) United States Patent
Clarke et al.

(10) Patent No.: US 9,227,479 B2
(45) Date of Patent: Jan. 5, 2016

(54) WADING VEHICLE CONTROL SYSTEM

(75) Inventors: Nigel Clarke, Whitley (GB); Edward Hoare, Whitley (GB); Thuy-Yung Tran, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/004,937

(22) PCT Filed: Mar. 15, 2012

(86) PCT No.: PCT/EP2012/054603
§ 371 (c)(1),
(2), (4) Date: Nov. 2, 2013

(87) PCT Pub. No.: WO2012/123555
PCT Pub. Date: Sep. 20, 2012

(65) Prior Publication Data
US 2015/0046032 A1   Feb. 12, 2015

(30) Foreign Application Priority Data

Mar. 15, 2011 (EP) ...................................... 1104367
Aug. 17, 2011 (EP) ...................................... 1114124
Feb. 15, 2012 (EP) ...................................... 1202617

(51) Int. Cl.
*B60G 17/018*   (2006.01)
*B60C 23/00*    (2006.01)
(Continued)

(52) U.S. Cl.
CPC .......... *B60G 17/019* (2013.01); *B60G 17/0165* (2013.01); *B60G 17/0195* (2013.01); *B60W 10/06* (2013.01); *B60W 10/119* (2013.01); *B60W 10/22* (2013.01); *B60W 30/184* (2013.01); *B60W 30/18009* (2013.01); *B60W 30/18018* (2013.01); *B60W 40/06* (2013.01); *G01F 23/296* (2013.01); *G01S 15/00* (2013.01); *G07C 5/00* (2013.01); *G08B 21/00* (2013.01);
(Continued)

(58) Field of Classification Search
USPC ............................................. 701/37; 340/442
See application file for complete search history.

(56) References Cited

U.S. PATENT DOCUMENTS 4,346,774 A * 8/1982 Hirota et al. .................. 180/167
5,315,295 A   5/1994 Fujii
(Continued)

FOREIGN PATENT DOCUMENTS

CN   201410920 Y   2/2010
CN   103534560 A   1/2014
(Continued)

OTHER PUBLICATIONS

International Search Report for PCT/EP2012/054603 dated May 23, 2012, 6 pages.
(Continued)

*Primary Examiner* — Thomas G Black
*Assistant Examiner* — Tyler Paige
(74) *Attorney, Agent, or Firm* — Reising Ethington P.C.

(57) ABSTRACT

A vehicle having a system for determining that there is a possibility that the vehicle has or is about to enter water at a vehicle wading depth. In response to determining that there is a possibility that the vehicle has or is about to enter water at a vehicle wading depth, the system is configured to implement one or more vehicle control strategies. The system comprises at least one remote sensor configured to remotely detect the presence of water about or ahead of the vehicle.

23 Claims, 6 Drawing Sheets

(51) Int. Cl.

| | | |
|---|---|---|
| *B60G 17/019* | (2006.01) | |
| *B60G 17/0165* | (2006.01) | |
| *B60W 10/06* | (2006.01) | |
| *B60W 10/22* | (2006.01) | |
| *B60W 10/119* | (2012.01) | |
| *B60W 30/18* | (2012.01) | |
| *B60W 30/184* | (2012.01) | |
| *B60W 40/06* | (2012.01) | |
| *G01F 23/296* | (2006.01) | |
| *B60G 17/0195* | (2006.01) | |
| *G01S 15/00* | (2006.01) | |
| *G08B 21/00* | (2006.01) | |
| *G07C 5/00* | (2006.01) | |

(52) U.S. Cl.
CPC ...... *B60G 2400/82* (2013.01); *B60G 2400/843* (2013.01); *B60G 2500/30* (2013.01); *B60G 2800/914* (2013.01); *B60W 2420/54* (2013.01); *B60W 2422/95* (2013.01); *G01F 23/2962* (2013.01)

(56) References Cited

U.S. PATENT DOCUMENTS

| | | | |
|---|---|---|---|
| 6,650,244 B1 * | 11/2003 | Chen et al. | 340/618 |
| 7,100,558 B2 | 9/2006 | Amanuma et al. | |
| 7,382,238 B2 * | 6/2008 | Kavaler | 340/438 |
| 7,889,087 B2 * | 2/2011 | Boss et al. | 340/626 |
| 8,221,174 B2 * | 7/2012 | March | 440/12.51 |
| 2002/0082966 A1 * | 6/2002 | O'Brien et al. | 705/36 |
| 2003/0036823 A1 * | 2/2003 | Mahvi | 701/1 |
| 2003/0060966 A1 * | 3/2003 | MacPhail et al. | 701/117 |
| 2006/0202863 A1 * | 9/2006 | Kavaler | 340/941 |
| 2009/0159020 A1 * | 6/2009 | Hall et al. | 123/41.11 |
| 2009/0187314 A1 * | 7/2009 | Kitamura et al. | 701/45 |
| 2010/0112387 A1 | 5/2010 | Nagasawa | |
| 2010/0204882 A1 * | 8/2010 | Giovaresco et al. | 701/36 |
| 2011/0202265 A1 * | 8/2011 | Norden | 701/113 |
| 2013/0307679 A1 * | 11/2013 | Tran et al. | 340/442 |
| 2014/0293746 A1 * | 10/2014 | Tran et al. | 367/93 |

FOREIGN PATENT DOCUMENTS

| | | | |
|---|---|---|---|
| CN | 103562692 A | | 2/2014 |
| DE | 19941126 A1 | | 4/2001 |
| DE | 10016147 A1 | | 10/2001 |
| DE | 102004028157 B3 | | 1/2006 |
| DE | 102008041105 A1 | | 2/2010 |
| DE | 102008042016 A1 | | 3/2010 |
| DE | 102009048173 A1 | | 5/2010 |
| EP | 2686646 A1 | | 1/2014 |
| EP | 2686647 A1 | | 1/2014 |
| FR | 2622639 A1 | | 5/1989 |
| GB | 2356602 A | | 5/2001 |
| GB | 2376929 A | | 12/2002 |
| GB | 2486453 A | | 6/2012 |
| JP | 61250510 A | | 11/1986 |
| KR | 20110109614 A | | 10/2011 |
| KR | 20110109618 A | | 10/2011 |
| WO | WO2012123554 A1 | | 9/2012 |
| WO | WO2012123555 A1 | | 9/2012 |
| WO | WO2012120970 A1 | | 8/2013 |

OTHER PUBLICATIONS

Great Britain Search Report for corresponding application No. GB 9927645.3, Aug. 10, 2000, 1 page.
Great Britain Search Report for corresponding application No. GB 0115748.6, Dec. 18, 2001, 1 page.
Great Britain Search Report for corresponding application No. GB 1021278.5, May 5, 2011, 1 page.
Great Britain Search Report for corresponding application No. GB 1204594.4, Jul. 2, 2012, 1 page.
Great Britain Search Report for corresponding application No. GB 1204593.6, Jul. 27, 2012, 1 page.
Great Britain Search Report for corresponding application No. GB 1114124.9, Dec. 14, 2011, 2 pages.
Great Britain Search Report for corresponding application No. GB 1202617.5, Jun. 11, 2012, 3 pages.
International Search Report for application No. PCT/EP2012/054602, Jun. 11, 2012, 4 pages.
International Search Report for application No. PCT/EP2013/053022, Apr. 3, 2013, 5 pages.

* cited by examiner

WADING VEHICLE CONTROL SYSTEM

CROSS-REFERENCE TO RELATED APPLICATIONS

This application claims priority from United Kingdom patent applications nos. GB1104367.6 filed Mar. 15, 2011, GB1114124.9 filed Aug. 17, 2011, and GB1202617.5, filed Feb. 15, 2012, the entire contents of each of which are hereby incorporated by reference.

TECHNICAL FIELD

This invention relates to wading of wheeled vehicles and particularly, but not exclusively, to a sensor operative to detect the presence of water about or ahead of the vehicle and to a system operative to take preventative or pre-emptive action to protect and/or prepare a vehicle that has or is possibly about to enter into a wading event. Aspects of the invention relate to a sensor, to a vehicle, to a system, to a program and to a method.

BACKGROUND

Road vehicles may be designed to travel through a body of water to a finite depth, which may be referred to as a maximum wading depth. Beyond this limit there is a risk that the vehicle engine may be damaged for example by the ingestion of water through the engine air intake and/or the vehicle electronics may be damaged by coming into contact with the water. Identifying that a vehicle has entered a wading situation or is in a wading event is advantageous so that control systems of the vehicle can be deployed.

Driver judgment is required when entering water at wading depth and this may require a consideration of not only the vehicle ground clearance, but also factors such as the location of the engine air intake. A vehicle driver does not generally know the depth of water the vehicle is about to enter or the nature of the terrain below the water surface. This is particularly so in low visibility conditions (dirty water, low-light, heavy rain, fog). It is recommended that a survey of the terrain is taken by wading through water on foot, but factors such as, the variability of the terrain; low visibility conditions; inconvenience to the driver; and driver impatience may result in a driver attempting to traverse water without knowledge of the water depth and therefore without being able to take appropriate precautions.

In WO/2012/080439 (PCT/EP2011/072998) (incorporated herein by reference) and WO/2012/080440 (PCT/EP2011/072999) (incorporated herein by reference) to the present applicant, systems for detecting that a vehicle is wading are described. It is disclosed in WO '439 that two series of ultrasonic transducers may be disposed across front and rear bumpers of a vehicle respectively. Immersion of the ultrasonic transducers in water is used to confidently determine that the vehicle is immersed in water, at least up to the height of the sensors. The sensors being positioned on the bumper are disposed at a height suitable for indicating that the vehicle is in a wading situation. In WO '440 another system for detecting wading is disclosed, in which a change in the time of flight, wavelength or amplitude of an acoustic pulse emitted and received by sensors of the system is used to detect the presence of water about the sensors.

In WO/2012/080429 (PCT/EP2011/072986) (incorporated herein by reference), also to the present applicant, a control system for a wading vehicle is described, wherein a vehicle, having a wading sensor adapted to identify wading above a predetermined depth of water, comprises a control system adapted to implement one or more vehicle control strategies upon detection of wading by said sensor.

In WO/2012/080438 (PCT/EP2011/072997) (incorporated herein by reference), also to the present applicant, a system is disclosed that upon detecting wading by means of a sensor, (such as that described in WO/2012/080439 (PCT/EP2011/072998) and WO/2012/080440 (PCT/EP2011/072999)) a downwardly facing ultrasound transducer is used to estimate a wading depth (D) of the water in which at least a portion of the vehicle is disposed.

In GB1202617.5 (incorporated herein by reference), also to the present applicant, a system is disclosed for determining vehicle wading depth and/or attitude by measured distances between range-finding transducers mounted in the door mirrors and the surface of water through which the vehicle is wading.

The present invention seeks to provide a further improvement for land-based vehicles, that may travel through water, by providing a system operative to take preventative or pre-emptive action to prepare and/or protect a vehicle that has entered into water or that is possibly about to enter into water well before a maximum wading depth limit of the vehicle is reached. Advantageously, the systems and methods of the present invention seek to predict that a vehicle may be about to enter into a wading event or has just entered into a wading event. Prior to the vehicle being disposed in water at a wading depth and well before the vehicle enters water close to the maximum wading depth, the systems and methods of the present invention prepare the vehicle. Preferably, the systems and methods of the invention prepare the vehicle for wading in advance of part-submersion of the vehicle body in water. Other aims and advantages of the invention will become apparent from the following description, claims and drawings.

In this specification, the term wading relates to travel of a land-based vehicle through water of a depth that is sufficient to require that the vehicle driver take appropriate precautions. To distinguish a wading event from a vehicle driving through a shallow puddle, in some situations wading depth may be defined as water of 200 mm or more in depth. In some situations water at a level of the front or rear wheel hubs may be indicative of a vehicle in water at wading depth. In some situations wading depth may be defined as the point at which a water contact sensor is immersed in water. However, the depth at which it is determined that a vehicle is wading (sometimes referred to as a threshold wading depth) may be determined by the vehicle design and it is therefore not possible to define a threshold wading depth that is appropriate for all vehicles. Similarly, the permissible maximum wading depth of a vehicle is determined by the vehicle design.

In this specification the term control threshold depth is used to define a depth of water, optionally relative to a vehicle in normal ride height that is optionally below or close to the threshold wading depth for a vehicle. In some situations control threshold depth may be defined as water of about 100 mm to about 200 mm or more in depth. In some situations, control threshold depth may be defined relative to the height of a tail pipe outlet of an exhaust system or other vehicle components and control threshold depth may be defined as at least 20 mm below the opening of vehicle exhaust tailpipe outlet.

Throughout the specification reference is made to the term water. It will be understood that in the context of a land-based vehicle driving through water, the term "water" is intended to encompass all liquid or fluidic media that a land-based vehicle may drive through and is not limited in its interpretation to pure $H_2O$. For example, as used herein water may mean, but not limited to: a muddy river bed; sea-water; a ford; and dirty water in off-road terrain.

SUMMARY

Aspects of the invention provide a sensor, a vehicle, a system, a program and a method.

According to one aspect of the invention for which protection is sought, there is provided a vehicle having a system for determining that that the vehicle has entered or is about to enter water at a vehicle wading depth and in response to determining that the vehicle has entered or is about to enter water at a vehicle wading depth, the system is configured to implement one or more vehicle control strategies, the system comprising at least one remote sensor configured to remotely detect the presence of water about or ahead of the vehicle.

Optionally, the system may be configured to determine that there is a possibility that the vehicle is about to enter water of at least 200 mm in depth and/or that the vehicle body is about to be at least partially immersed in water and in response to determining that there is a possibility that the vehicle is about to enter water of at least 200 mm in depth and/or that the vehicle body is about to be at least partially immersed in water, the system is configured to implement one or more vehicle control strategies before the vehicle enters into water of at least 200 mm in depth and/or before the vehicle body is at least partially immersed in water Optionally, the system may comprise at least two remote sensors disposed on either side of the vehicle.

Optionally, the system may comprise a first remote sensor located on a left side mirror of the vehicle and a second remote sensor located on a right side mirror of the vehicle. It will be appreciated that the term "side-mirror" refers to a mirror mounted externally to the side of the vehicle, proximate a driver or passenger compartment and is typically affixed to the driver and passenger doors.

Optionally, at least one of said at least one remote sensor(s) may be an ultrasonic transducer sensor.

Additionally or alternatively, the at least one remote sensor may be configured to remotely detect the presence of water by the sensor emitting a signal and by the same or another sensor receiving a reflection of that signal and by the system being configured to analyse the reflected signal.

Optionally, the system may be configured to analyse the reflected signal by interrogating the amplitude and/or phase of the reflected signal and the presence of water is determined by the system identifying a defined change in the amplitude and/or phase of the reflected signal indicative that the signal was reflected from an air/water interface. Optionally, the defined change may be indicative of a change in the dielectric constant of the medium from which the emitted signal was reflected.

Additionally or alternatively, the system may comprise a control unit, wherein the at least one remote sensor is coupled to the control unit and the at least one remote sensor is configured to detect the presence of water about or ahead of the vehicle at a control threshold depth, which control threshold depth is less than a wading depth of the vehicle and wherein the control unit is configured to determine that there is a possibility that the vehicle is about to enter water at a wading depth based upon the detection of the presence of water about or ahead of the vehicle at the control threshold depth.

Optionally, the control threshold depth is between about 100 mm and about 200 mm.

Optionally, the system may comprise at least one contact sensor configured to detect the presence of water by the sensor being in contact with water.

Optionally, at least one contact sensor may be configured to detect the presence of water at a control threshold depth by the sensor being in contact with water at the control threshold depth.

Optionally, the at least one remote sensor and/or said at least one contact sensor may be configured to determine a depth of the water relative to the vehicle or an absolute depth of the water.

Additionally or alternatively, a remote sensor and a contact sensor may be provided by a single ultrasonic transducer sensor.

Optionally, the at least one contact sensor may be mounted to the underside of the vehicle, preferably proximate or adjacent to any of: a vehicle exhaust tailpipe, a vehicle exhaust particle filter, an under-body battery pack, an inner wing, a radiator support, a suspension sub-frame, a bumper beam and/or a wheel arch liner.

Optionally, the at least one contact sensor is a capacitive sensor, a resistive sensor or an hydrostatic pressure sensor.

Additionally or alternatively, said one or more vehicle control strategies may comprise any one or more of:
  (i) suspending a stop/start function of a powertrain to prevent automatic shut down of a combustion engine;
  (ii) activating a stopped combustion engine (optionally if the vehicle is a hybrid vehicle being powered by an electric powertrain);
  (iii) preparing an actuator of a ride height adjustment mechanism so that ride height can be adjusted;
  (iv) increasing the ride height of the vehicle;
  (v) initiating 4WD transmission mode;
  (vi) selecting low-range on a transfer box; and
  (vii) preparing the vehicle for preventing ingress of water via the vehicle tail pipe by increasing the exhaust gas pressure or flow rate in the tail pipe to mitigate against or prevent ingress of water via the tail pipe.

Optionally, the at least one pre-emptive control strategy may comprise preparing the vehicle for preventing ingress of water via the vehicle tail pipe by any one or more of: increasing the exhaust gas pressure by: increasing engine idle speed; activating a mechanism to increase the height of the tailpipe exhaust outlet; and switching a hybrid vehicle to electric drive mode only and sealing the tailpipe exhaust outlet.

According to another aspect of the invention for which protection is sought, there is provided a method of controlling a vehicle to determine that there is a possibility that the vehicle has or is about to enter water at a vehicle wading depth, the method comprising:
  (i) using at least one remote sensor configured to remotely detect the presence of water about or ahead of the vehicle;
  (ii) detecting the presence of water about or ahead of the vehicle; and in response thereto
  (iii) determining that there is a possibility that the vehicle has or is about to enter water at a vehicle wading depth; and
  (iv) implementing one or more vehicle control strategies.

Optionally, in the method of the preceding paragraph, when it is determined that there is a possibility that the vehicle is about to enter water at a vehicle wading depth, the step of implementing one or more vehicle control strategies is carried out before the vehicle enters water at the wading depth.

According to yet another aspect of the invention for which protection is sought, there is provided a program for implementing the method of the preceding paragraph.

According to yet a further aspect of the invention for which protection is sought, there is provided a kit of parts for installation and assembly to a vehicle, the assembly comprising: at least one remote sensor and a program according to the preceding paragraph and whereupon installation of the kit of parts in a vehicle, a vehicle according to any of the relevant preceding paragraphs is formed.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which:

in FIG. 2 a series of water levels relative to the vehicle are depicted in dashed lines;

DETAILED DESCRIPTION OF EMBODIMENTS

Figure 1:
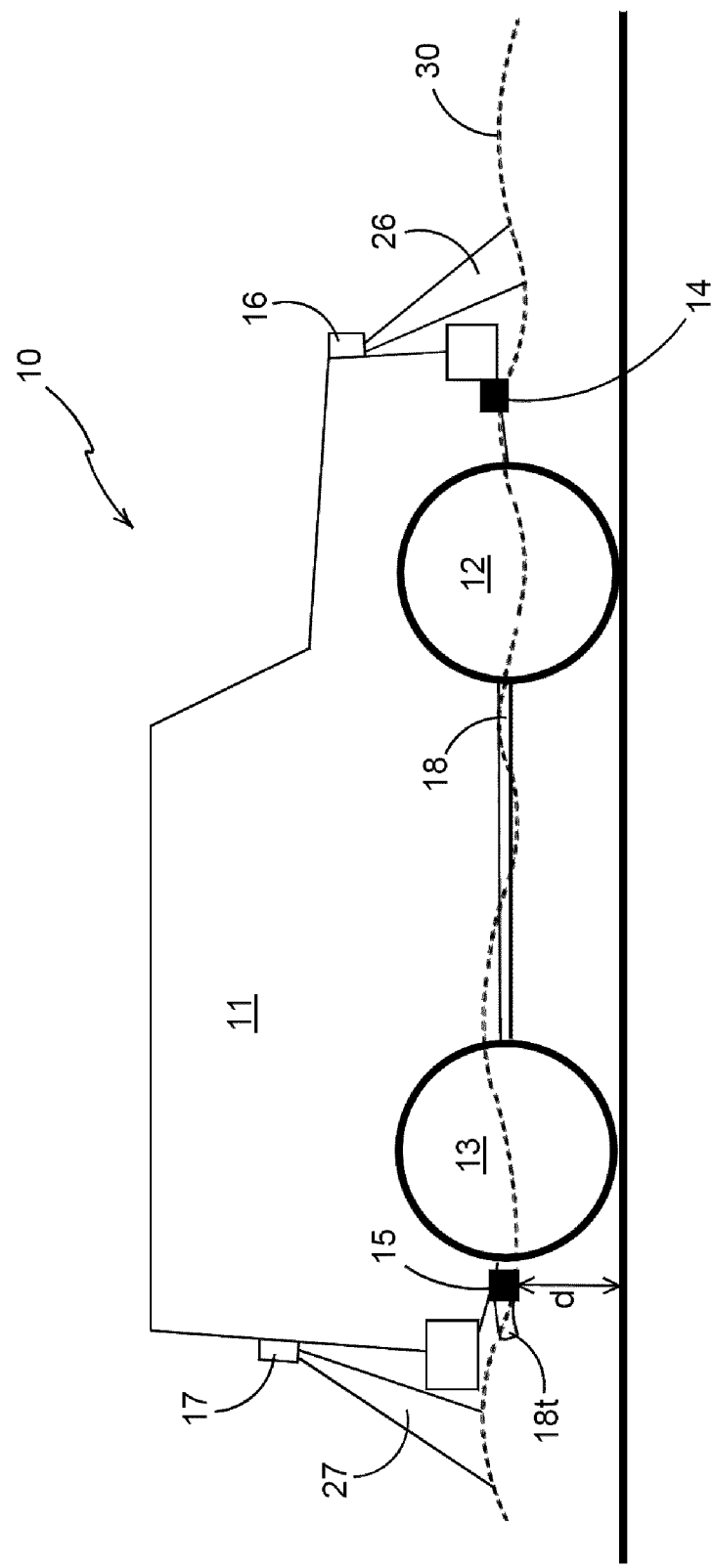
FIG. 1 is a schematic drawing of a wading vehicle having a remote sensor according to one aspect of the invention and optionally having a contact sensor according to another aspect of the invention.

Detailed descriptions of specific embodiments of the vehicle, system, method and sensors of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the vehicle, system, method and sensors described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Generally, aspects of the present invention relate to a system for a vehicle configured to monitor the environment in which the vehicle is being driven, specifically to determine whether there is a possibility that the vehicle may be about to enter into a wading situation (which may optionally be defined as the vehicle entering water of 200 mm or more, and/or may optionally be defined as a part of the vehicle body being immersed in water). The use of remote ranging sensors enables the approach of a surface of a body of water toward the vehicle to be monitored as the vehicle drives toward, into and through a body of water. In response to making a determination that a vehicle may be about to enter into a wading situation, the system is configured to initiate one or more pre-emptive actions to prepare the vehicle for wading. Preferably by determining ahead of time that a vehicle may be about to travel into water, pre-emptive control actions can be taken before the vehicle enters into particularly deep water, preferably before the vehicle body is at least partially immersed in water and certainly well before the maximum wading depth of the vehicle.

As such, aspects of the present invention relate to a system for a vehicle that uses remote ranging and/or contact sensors to track the rise (and/or optionally fall) of a water surface level as a vehicle approaches, enters and progresses through the water and/or optionally departs from the water.

Said remote sensors may, for example include, but not are limited to, one or more or a combination of: acoustic, electromagnetic and optical type sensors to measure reflections from the surface of the water.

Said contact sensors may optionally include liquid level measurement sensors, for example including but not limited to sensors measuring a change, due to the presence of water, in: pressure, electrical characteristic (for example capacitance, resistance), electromagnetic (for example optical) and radio frequency time-of-flight).

Additional data optionally obtained from other systems of the vehicle for example, but not limited to: the selected terrain mode (OFF-ROAD, ON-ROAD); the transmission mode (2WD, 4WD, high or low range); the vehicle driving speed; the vehicle driving direction (forwards, reverse); rain sensor data; external camera imagery; GPS and other satellite or other navigation system data; the attitude of the vehicle (roll, yaw and pitch); and ride-height, may be used by the system of the present invention. Information from the vehicle may be transmitted directly to the system of the present invention from the vehicle control system having that data (for example, the suspensions system) or may be transmitted via an associated controller via a vehicle CAN-bus or similar vehicle-based data network.

In this way, embodiments of the present invention provide a system that receives timely information to enable measures to be taken to assist and manage the vehicle as it enters and passes through water. For example, the data provided to and analysed by a system, may be used to determine whether there is a possibility that a vehicle has or may be about to enter into a wading situation. This may be referred to as a "positive determination". In response to making a positive determination, the system may cause, for example, any one or more of the automatic (or driver instructed):

activation of an internal combustion engine (optionally of a hybrid vehicle that was operating in electric only drive mode);

suspension of a start-stop fuel saving mode of a vehicle;

activation of an air-compressor to prepare an actuator of a ride-height adjustment mechanism that may require replenishment time) on a vehicle with variable ride height;

adjustment of the vehicle ride height;

activation of headlights;

selection of an alternate engine air intake tract;

change in powertrain and/or change in transmission settings.

Advantageously, a system of the invention employing remote measurement sensors offers the ability to determine water presence ahead of the vehicle, before the vehicle enters the water or before the vehicle body enters the water. Contact sensors placed low-down on a vehicle for early detection of the presence of water can give rise to difficulties concerning their location and robustness. Furthermore, an indication of water presence from a contact sensor located on the vehicle body is indicative of that part of the vehicle already being submerged. In some driving situations an indication of water presence from a contact sensor located on the vehicle body may not be sufficiently early to enable vehicle preparations to be conducted before the vehicle enters even deeper water (giving consideration to the steepness of an inclined slope into water and/or the speed of the vehicle). Nevertheless, the data from contact sensors increases the confidence in the system's determination that the vehicle is disposed, at least in part, in water and the information from such sensors is nevertheless a valuable aspect of the invention in certain embodiments.

Turning now to a specific illustrated embodiment of an exemplary embodiment of the invention, reference is made to FIG. 1. FIG. 1 illustrates a two-axle vehicle 10 in schematic form comprising a body 11 and wheels 12, 13. The vehicle 10 comprises a system (not numbered) for determining whether there is a possibility that the vehicle 10 may be about to enter into a wading situation. The system comprises a control unit (not illustrated) coupled to one or more water detection sensors 14, 15 (also referred to simply as sensors 14, 15). A first of the water detection sensors 15 is mounted to the vehicle 10 underside, optionally adjacent to or located on an exhaust system 18 component. A second water detection sensor 14 is provided, optionally also located on the underside of the vehicle body 11. Preferably, though nevertheless optionally, the two water detection sensors 14, 15 are located adjacent the front and rear lower edges of the vehicle 10 respectively. As is shown in FIG. 1, the rearmost water-detection sensor 15 is mounted adjacent to a tailpipe 18t of the exhaust system 18 of the vehicle 10.

The sensors 14, 15 are configured and arranged optionally to detect a change in the medium with which the sensors 14, 15 are in contact and/or to detect the presence of a (water) surface 30 disposed substantially beneath the sensors 14, 15 and/or to estimate the distance between the sensor 14, 15 and the (water) surface 30 intermediate the sensors 14, 15 and the ground.

It may be seen from FIG. 1 that the sensors 14, 15 are mounted at or below the level of at least part of a vehicle exhaust system 18. This arrangement is configured to be in contact with, or otherwise detect, the presence of water as soon as the water reaches a height 'd' where the water may affect the performance of the vehicle 10 exhaust system 18. It will be appreciated by one skilled in the art that significant ingestion of water into the exhaust system is highly undesirable. The risk of water ingestion is increased for a hybrid vehicle being driven either in electric only mode (where no exhaust gas is emitted from the exhaust system) or for a vehicle employing start-stop fuel saving technology, where the internal combustion engine may be temporarily suspended thus suspending the emission of exhaust gas which may otherwise resist ingress of water.

The sensors 14, 15 illustrated in FIG. 1 optionally are ultrasound emitters/receivers (transducers). Such sensors 14, 15 may include a diaphragm which is energized momentarily to transmit an ultrasound pulse. Such a diaphragm has a substantially different settling time in water, as compared with the settling time in air, and can thus be adapted to give the required output signal upon contact with water. For contact-sensing of the presence of water, the settling time of a diaphragm of the ultrasound transducer may be monitored by the control unit to determine the presence of water about the sensor 14, 15 (as is described in WO/2012/080439 (PCT/EP2011/072998) and WO/2012/080440 (PCT/EP2011/072999)).

Additionally, in another embodiment of the invention, the sensors 14, 15 are remote ranging sensors. Optionally the sensors 14, 15 are arranged to face substantially downwardly or at a declined angle as desired in order to measure the distance to a surface 30 beneath the sensor 14, 15. In the presently illustrated exemplary embodiment, each sensor 14, 15 is an ultrasound transducer 14, 15 and is capable of emitting an ultrasound pulse and receiving a reflection of that pulse. The time of flight (TOF) of an ultrasound pulse in air is known; the mounting height of the ultrasound transducer 14, 15 is also known (giving due regard to vehicle ride height and attitude). Therefore the distance from the sensor 14, 15 to an object or surface level below the sensor can be determined. In normal ride height and dry conditions the detected distance will be 'd', the distance between the sensor 14, 15 and the ground level. However, if a water surface 30 is present between the sensor 14, 15 and the ground level, then the reflected ultrasound pulse will arrive back at the sensor 14, 15 in a shorter time (having travelled a shorter distance). From the measured TOF data signal, the distance $d_{30}$ to the water level surface 30 can be determined and as such an estimation of the water depth $D_{water}$ can also be made: $D_{water}=d-d_{30}$. (Again due regard to and compensation for the vehicle 10 ride height and vehicle 10 attitude is preferable in order to estimate the depth of the water accurately).

It will be appreciated that in other envisaged embodiments, only one sensor 14, 15 may be provided on the vehicle 10. In other envisaged embodiments a single sensor 15 may be disposed at, adjacent or close to an exhaust tailpipe 18t of the vehicle 10. Alternatively, more than one sensor 14, 15 may be provided on the vehicle 10. The sensors 14, 15 may be variously positioned and arranged. The greater the number of sensors used, the greater amount of data regarding the vehicle environment is provided to the system and the more accurate may be the system's determination of a possibility of the vehicle 10 entering water of a sufficient depth that taking precautious control operations is justified.

Additionally or alternatively, remote sensors 16, 17 are optionally provided. The remote sensors 16, 17 may be acoustic transducers and may for example transmit a pulsed ultrasound beam 26, 27 which is detected upon reflection. The signal transmission time (TOF) is, as described above, used by the system to determine the relative position of water surface 30 level with respect to the mounting position of the sensors 16, 17 on the vehicle 10. From this information, an estimation of the depth of the water within the range of the sensor's beam 26, 27 can be calculated.

It will be appreciated by one skilled in the art that where the remote sensors 16, 17 are fitted to a vehicle 10 with adjustable ride height, the calculation or estimation of water depth based on the fixed-position of the sensors 16, 17 will require compensation to take into account the current ride height and/or attitude of the vehicle 10. Information indicative of the ride height and attitude of the vehicle 10 may be transmitted by the vehicle suspension or an associated controller via a vehicle CAN-bus or similar vehicle-based data network.

The remote sensors 16, 17 are used in the system of the presently described embodiment to detect the surface 30 of water disposed about the vehicle 10. At the time illustrated in FIG. 1, the vehicle is disposed in a depth 'd' of water that may be considered as equal to or greater than a wading depth (giving consideration to the partial submersion of the tailpipe 18t). However, during a time period prior to the vehicle 10 entering into water of that depth d, the remote sensors 16, 17 and/or remote and contact sensors 14, 15 will have issued data to the control unit of the system. Analysis of the data by the system will have enabled the system to gradually detect an increase in the relative position of the water surface level 30 over time (indicating a rise in water level, where the surface 30 gradually approaches the vehicle under-body) and from this and optionally by using a control threshold depth, the system would have made a determination that there was a possibility that the vehicle 10 was about to enter into water of a significant depth, prior to the vehicle 10 being at least partially immersed in water of depth 'd'. Optionally, the control threshold depth may be between about 100 mm and about 200 mm.

In this embodiment, the vehicle 10 is optionally a hybrid vehicle 10 having both an internal combustion engine (now shown) and an electric motor (not shown). As such the vehicle 10 has a powertrain comprising two means of propulsion: an internal combustion engine and an electric motor. The system for detecting a possibility that the vehicle 10 may be about to enter into sufficiently deep water is optionally configured to issue a command signal to a powertrain controller. The powertrain controller (not illustrated) is arranged to control the powertrain to provide the vehicle 10 with a stop/start mode for improving fuel consumption and/or emissions when the vehicle 10 is stationary. In other envisaged embodiments, the vehicle 10 is not a hybrid vehicle, but may nevertheless have a powertrain controller (not illustrated) arranged to control the powertrain to provide the vehicle 10 with a stop/start mode for improving fuel consumption and/or emissions when the vehicle 10 is stationary.

Specifically, as is known, the powertrain controller may be arranged to switch off the engine automatically when the vehicle 10 comes to a standstill and the brake pedal is depressed or the parking brake is actuated. When the brake pedal is released and/or the throttle pedal depressed, the powertrain controller is arranged to start the engine automatically so that the vehicle 10 can move off.

In this embodiment and other embodiments, the powertrain controller, in dependence on the system for determining the possibility that the vehicle 10 may be about to enter a wading event or that part of the vehicle body 11 may be partially submerged, is commanded or instructed or otherwise arranged to temporarily suspend activation of the stop/start mode in order to reduce the risk of water ingress into an exhaust system 18 or other vehicle 10 component whilst wading is in progress. That is, the powertrain controller is prevented from stopping the engine during wading, even if the vehicle 10 becomes stationary with the brake pedal depressed and/or the parking brake activated.

The system of the presently described embodiment is also configured such that if the hybrid vehicle 10 was operating in electric only drive mode, at an appropriate time at or shortly after determining that there is a possibility that the vehicle 10 will enter into a body of water optionally at wading depth, the system will communicate with the powertrain controller to activate the internal combustion engine. This may optionally be of benefit to enable a positive pressure to be generated in the exhaust system 18 to reduce the possibility of or the effects of water ingress into the exhaust and exhaust gas after-treatment system components, prior to or well before a water level reaches the level of the exhaust tail pipe 18t. As such, the one or more pre-emptive action(s) taken by the system may be a protective or preventative measure to ensure that the exhaust system 18 is protected against water ingress well before the exhaust tailpipe 18t is submerged in water at or above vehicle a threshold wading depth.

Additionally, when information about the depth 'd' of the water is available to the system, the system may cause (either directly or via the ECU) the exhaust gas pressure to be appropriately controlled optionally by regulating the idle speed of the engine by modifying the engine speed control system (throttle, fuel injection for example, as appropriate). When it has been determined by water depth measurement (from sensors 14, 15, 16, and/or 17) that the exhaust tail pipe outlet 18t is or is possibly about to be submerged the engine speed may be also raised, or controlled, further, if necessary, to increase the positive pressure in the exhaust system. This equally is applicable to vehicles travelling forwards or backwards (for example, boat launch/recovery). Optionally, in other embodiments, the system may be configured to have a lower control threshold depth in certain situations, for example, in the situation where the vehicle 10 is being driven in reverse gear; and/or in a "nose-up" attitude. This is because the exhaust tail pipe outlet 18t will reach water at its level more quickly compared to the vehicle 10 moving forwards, where the tail pipe 18t is at the trailing end of the vehicle 10 rather than at the leading end.

Figure 2:
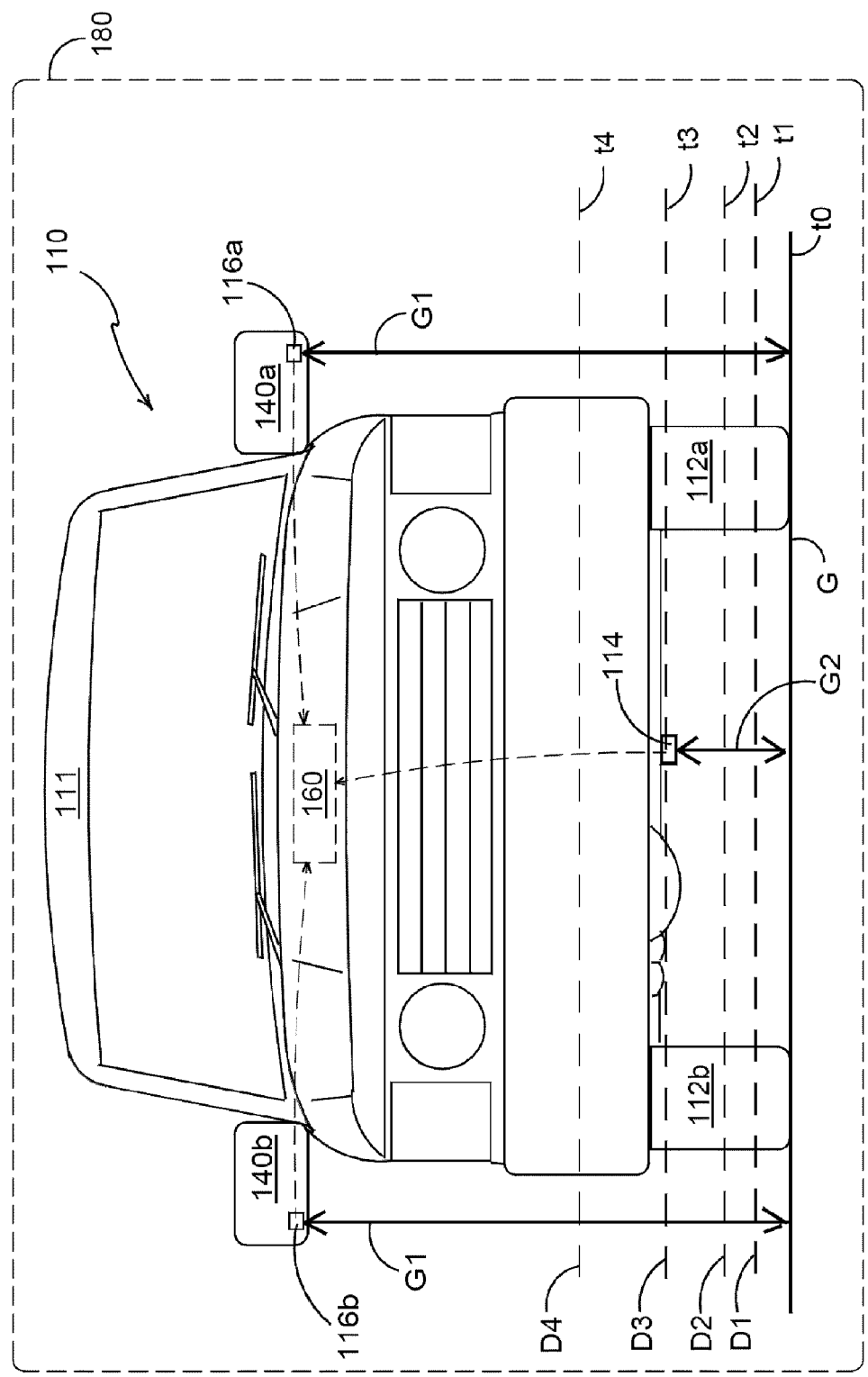
FIG. 2 is a schematic front view of a vehicle having a system for pre-emptively controlling vehicle operations or functions in response to the detection of water about the vehicle before the vehicle enters water at wading depth and/or before the vehicle body is partly immersed in water.
Figure 3A:
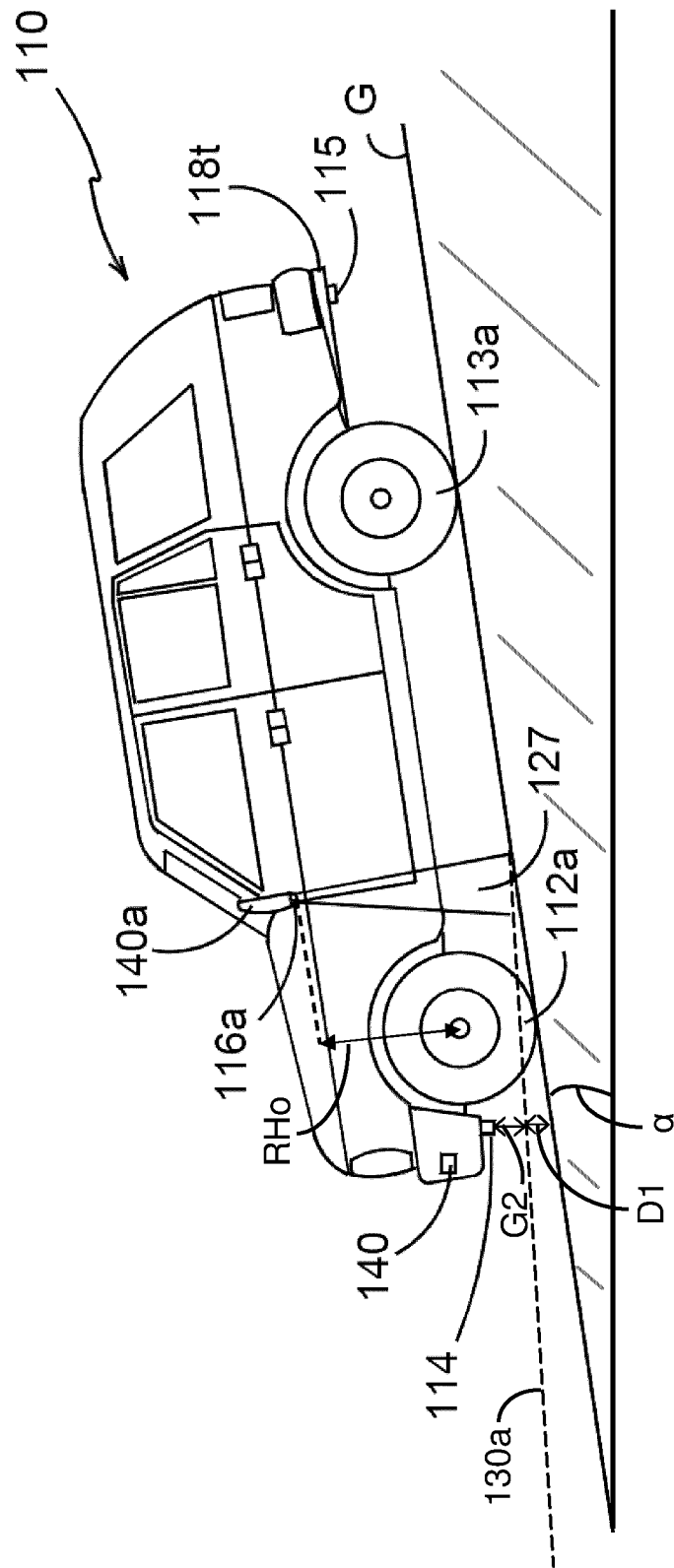
FIG. 3a is a schematic side view of the vehicle of FIG. 2 positioned on an inclined surface travelling toward and entering water of unknown and variable depth; wherein a vehicle control system is configured to detect the early presence of water at a depth $D_1$ that is below a threshold wading depth for the vehicle and which is below an optional control threshold depth of the system.
Figure 3B:
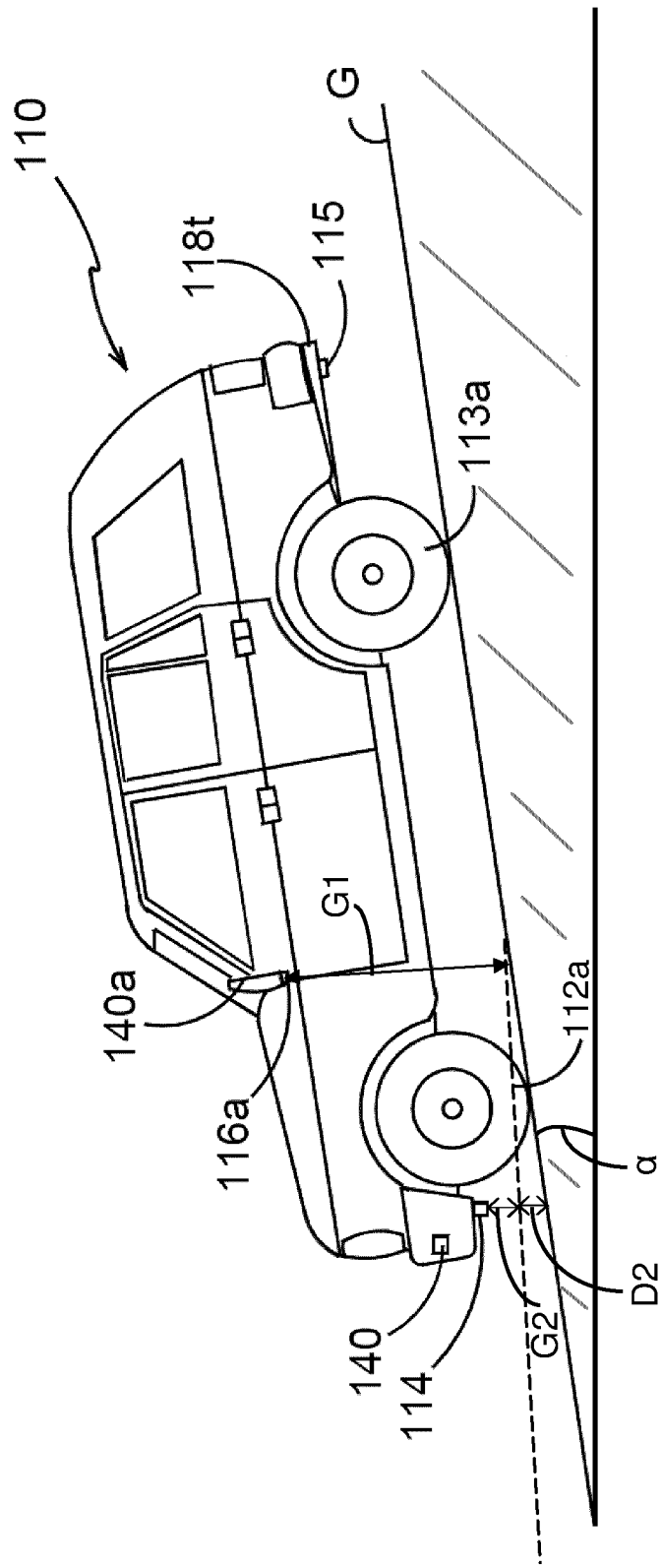
FIG. 3b is a schematic side view of the vehicle of FIG. 2 positioned on an inclined surface travelling toward water and partially disposed in water, wherein a remote sensor of the vehicle control system is configured to detect the presence of water at depth $D_2$.
Figure 3C:
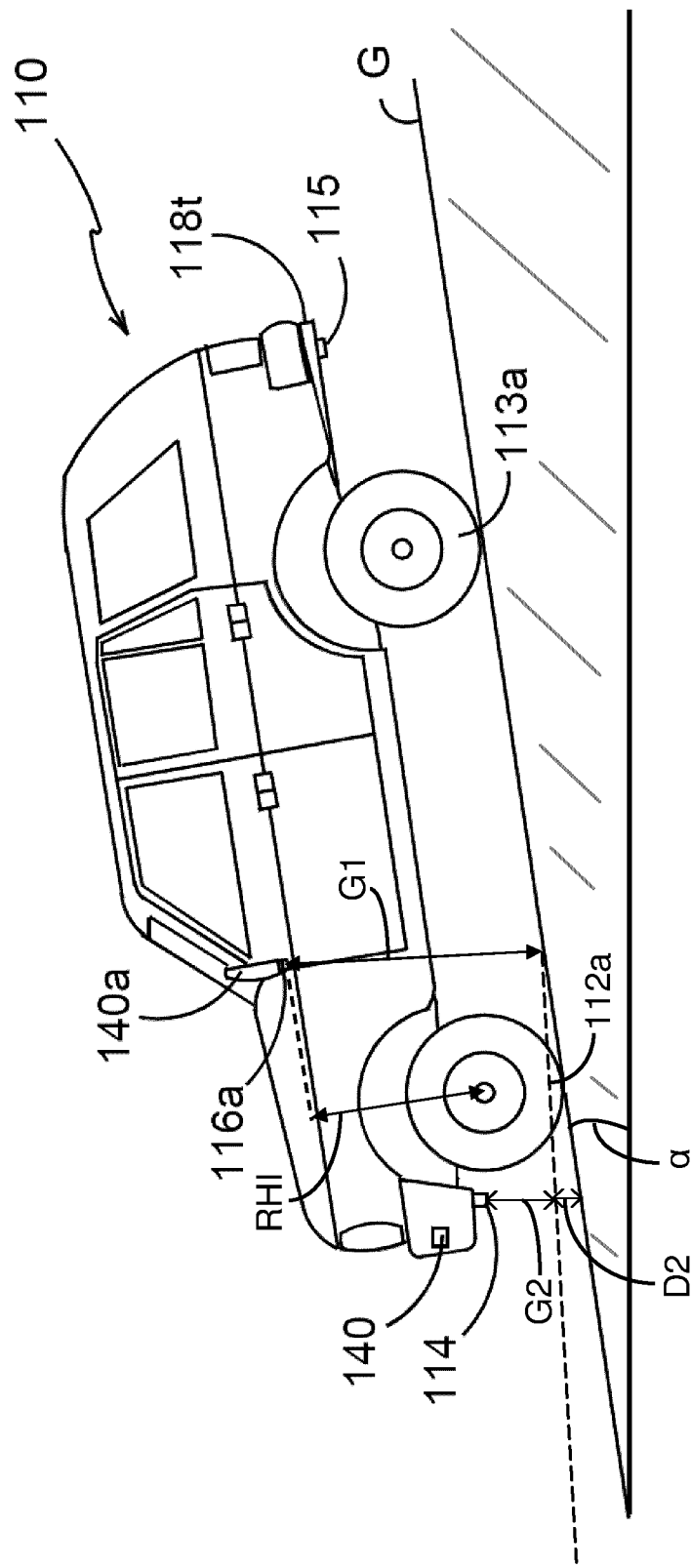
FIG. 3c is a schematic side view of the vehicle of FIG. 3b wherein the vehicle control system has taken pre-emptive action by raising the ride height of the vehicle, in response to the detection of water at a control threshold depth $D_2$.
Figure 3D:
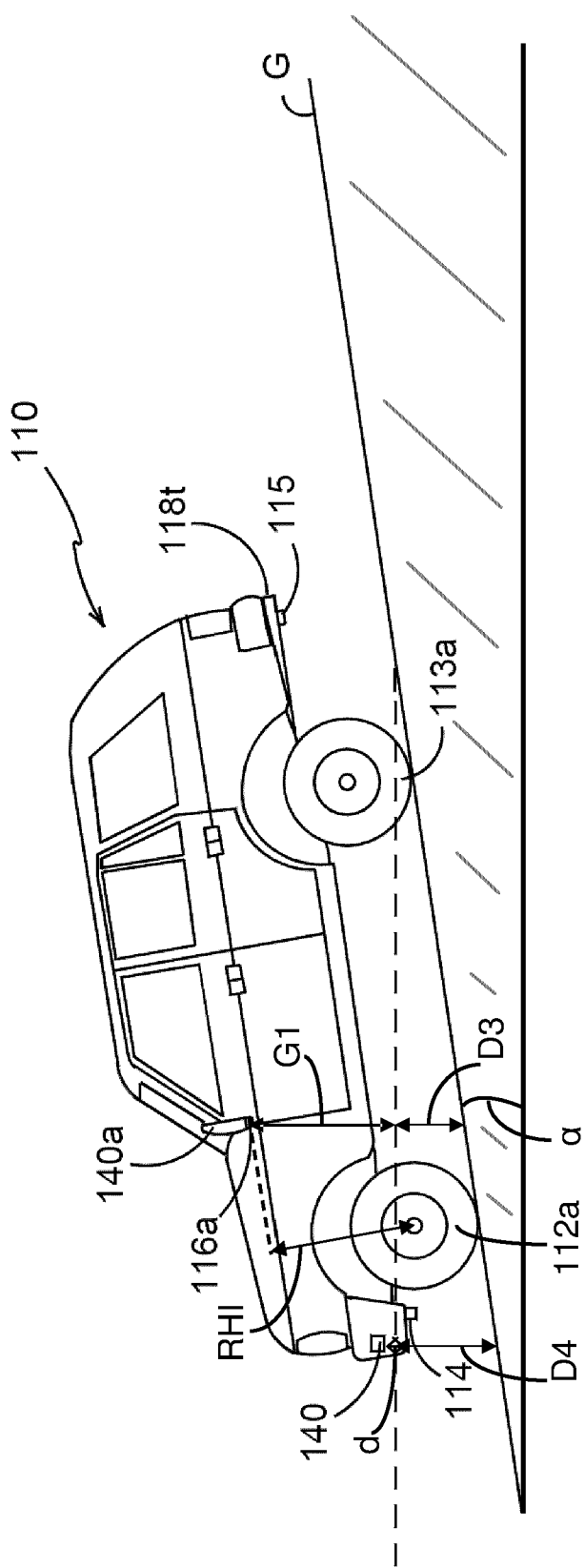
FIG. 3d is a schematic side view of the vehicle of FIG. 3c having travelled further down the inclined surface and further into the water.

In a further embodiment of the invention, illustrated in FIGS. 2 to 3d there is provided a vehicle 110 having a body 111 and a system 180 comprising one or more or a combination of sensors 116a, 116b, 114, 115, 140 for remotely detecting the presence of water. The one or more sensors 116a, 116b, 114, 115, 140 are coupled to a control unit 160 and are configured to issue data to the control unit 160 of the system 180. Remote sensors 116a, 116b may be mounted to each of the side mirrors 140a, 140b. In another embodiment of the invention the system comprises only remote sensors 116a, 116b. Optionally, the vehicle 110 may also comprise one or more contact sensors 140 disposed along the front and/or rear bumper of the vehicle 110 for further confirming a minimum water depth in which the vehicle 110 is disposed. Optionally, an under-body mounted sensor 114, 115 may be located on the exhaust system of the vehicle 110. In the presently illustrated embodiment, each sensor 116a, 116b, 114, 115, is a substantially downwardly facing ultrasonic transducer capable of emitting and receiving an ultrasound pulse as described above. In the illustrated example of FIGS. 3a and 3b, the vehicle 110 is travelling at normal ride height RH0 and on an inclined pitch. In the illustrated example of FIGS. 3c and 3d, the vehicle 110 is travelling at increased ride height RH1. Data from each sensor 116a, 116b, 114, 115, 140 is made available to the control unit 160 of the system 180, as mentioned above, information indicative of the ride height RH0 and attitude of the vehicle 110 as well as other information (for example journey route information from a navigation system which may provide relevant data regarding the terrain ahead of the vehicle 110, such as the presence of a ford) may be transmitted by the vehicle 110 suspension or an associated controller via a vehicle 110 CAN-bus or similar vehicle-based data network to the control unit 160 of the system 180.

Now, with reference to FIG. 2, a vehicle 110 is shown in which a progressively increasing water level is depicted (by a series of dashed lines, $D_1$, $D_2$, $D_3$, $D_4$) relative to a vehicle 110 disposed on a flat surface at normal ride height. In the depicted situation, the water level has steadily risen from:
ground level G at $t_0$; to
a shallow non-wading depth D1 at time $t_1$; to
a shallow, non-wading first control threshold depth of the vehicle D2 at time $t_2$; to
a wading depth of the vehicle D3 at time $t_3$; and
to a deeper, but non-maximum wading depth D4 at time $t_4$.

The control unit 160 is configured to conduct an assessment of the environment the vehicle 110 is in by analysing the data issued to it by the one or more sensors 116a, 116b, 114, 115, 140 and optionally other vehicle sensors and other vehicle parameters issued to it over time.

Water (in the absence of a drain or tap or significant current), tends to adopt a substantially level surface. The side mirrors 140a, 140b are spaced apart on the same lateral axis of the vehicle 110 (side-to-side axis of the vehicle 110, for example between the left and right side mirrors). Therefore the detection of a surface of equal or substantially equal depth by each side-mirror 140a, 140b mounted sensor 116a, 116b can be used to determine with reasonable confidence that a level but non-ground surface exists between the mirrors 140a, 140b and therefore that at least part of the vehicle 110 is disposed in water. Range data from the sensors 116a, 116b can be used to derive or estimate with a reasonable degree of accuracy the depth of the water along that lateral axis (giving due regard to and compensating for the attitude of the vehicle 110).

Thereby, with reference to the situations illustrated in FIG. 2, the system 180 of the present embodiment is provided with the following data over time:

At time period $t_0$, the system 180 is provided with the following data:
sensor 116a: surface level detected at distance G1, matches the distance to ground G;
sensor 116b: surface level detected at distance G1, matches the distance to ground G;
sensor 114: surface level detected at distance G2, matches the distance to ground G and no indication of water in contact with sensor 114;

At time period $t_0$, the system 180 is configured to determine that at least the front of the vehicle 110 is not disposed in any water and monitoring of the data received by the control unit 160 of the system 180 is continued.

At time period $t_1$, the system 180 is provided with the following data:
sensor 116a: surface detected at distance less than distance to ground level G, at depth D1 above ground level G;
sensor 116b: surface detected at distance less than distance to ground level G, at depth D1 above ground level G;
sensor 114: surface detected at distance less than ground level G, at depth D1 above ground level G;

At time period $t_1$, the system 180 is configured to determine that the vehicle 110 is likely to be disposed in shallow water of depth $D_1$. This is because remote sensors 116a, 116b that are positioned on the left and right hand sides of the vehicle 110 (and at substantially the same distance along a longitudinal (front to rear) axis of the vehicle 110) give an equal or substantially equal depth measurement. It is unlikely that any other object would interrupt the path of the sensor beam 127 at the same height on either side of the vehicle 110. Furthermore, the under-body remote sensor 114 has detected the same water level (within an acceptable tolerance). The system 180 is also configured to determine that because the depth D1 is greater than the ground level the vehicle 110 is moving into water that is increasing in depth. Monitoring of the data received by the control unit 160 of the system 180 is continued but the system 180 at this stage takes no other action. At a depth $D_1$, the water level alone may not be taken as a positive determination that the vehicle 110 may be about to enter water of a sufficient depth to require precautions to be taken. Indeed the shallow depth water $D_1$ may merely be a puddle. As such the system is configured in this embodiment to gather further data.

At time period $t_2$, the system 180 is provided with the following data:
sensor 116a: surface detected at distance less than distance to ground level G, at depth D2 above ground level G;
sensor 116b: surface detected at distance less than distance to ground level G at depth D2 above ground level G;
sensor 114: surface detected at distance less than distance to ground level G at depth D2 above ground level G;

At time period $t_2$, the system 180 is configured to determine that the vehicle 110 is disposed in shallow water (for the same reason as above—remote sensors 116a, 116b on same lateral axis detect similar depth $D_2$). Because the water depth is measured to be at the control threshold depth and/or because the water level has risen from D1 to D2 indicating that the vehicle 110 is still moving into still deeper water, the system 180 determines that there is a possibility that the vehicle 110 will enter into deeper water. The system 180 is configured to take at least one appropriate pre-emptive action upon or shortly after making this positive determination in order to protect the vehicle 110 and/or to prepare the vehicle 110 for wading (for example: suspend start-stop mode; or activate internal combustion engine if off; and/or increase vehicle ride-height).

By making a determination that the vehicle 110 is likely to be entering deeper water the system 180 is configured to take at least one pre-emptive action either automatically or by alerting the driver and making recommendations to the driver for the driver to take at least one pre-emptive action. The at least one pre-emptive action in the presently described embodiment is to de-activate (or at least temporarily suspend) the "start-stop" mode of a hybrid vehicle. (The "start-stop" mode may also be referred to as the Engine Fuel Saving Mode.)

At time period $t_3$, the system 180 is provided with the following data:
sensor 116a: surface detected at distance less than distance to ground level G, at depth D3 above ground level G;
sensor 116b: surface detected at distance less than the distance to ground level G, at depth D3 above ground level G;
sensor 114: water detected in contact with sensor 114 at depth D3 above ground level G which is, in this situation equivalent to the wading depth threshold for the vehicle 110;

At time period $t_3$, the system 180 is configured to determine that the vehicle 110 is disposed in water at depth D3, a threshold wading depth. This determination is a confident determination because water is in contact with the contact-sensor 114 at the vehicle 110 wading depth height. Additionally the system 180 is configured to store data previously received at one or more immediately preceding time intervals and therefore the system 180 is aware that the water level has risen from D2 to D3 and from this additional data, the system 180 is configured to determine that the vehicle 110 is still moving into deeper water and that there is a possibility that the vehicle 110 will enter into even deeper water. At least one action may optionally be taken at or shortly after this determination to protect the vehicle and further prepare the vehicle and driver for wading (as described in WO/2012/080429 (PCT/EP2011/072986)).

At time period $t_4$, the system 180 is provided with the following data:
- sensor 116a: surface detected at distance less than distance to ground level G, at depth D4 above ground level G;
- sensor 116b: surface detected at distance less than distance to ground level G, at depth D4 above ground level G;
- sensor 114: water detected in contact with sensor 114;

At time period $t_4$, the system 180 is configured to determine that the vehicle 110 is disposed in water of a depth greater than the threshold wading depth but less than maximum wading depth. All pre-emptive actions have already been taken. Further control strategies may be initiated as described in WO/2012/080429 (PCT/EP2011/072986).

In the presently described and illustrated embodiment, the system 180 is further configured to exit the vehicle 110 from the "prepared for possibility of wading mode". This is so that the system 180 or an additional system, can appropriately override the pre-emptive control strategies that were taken when a positive determination regarding the possibility of the vehicle 110 entering into water at wading depth were implemented. Additionally or alternatively, the exit strategy implemented by the system 180 may initiate other alternative vehicle operations or may only selectively undo or override the pre-emptive control strategies that were carried out. The system 180 presently described is configured to determine that a suspended start-stop mode can be reactivated, for example:
- manually by the driver at any time; or
- automatically or manually by the driver when vehicle drive speed exceeds a non-wading threshold drive speed (optionally the non-wading threshold drive speed may be between about 8 kph and about 15 kph); or
- automatically if the water level detected by all sensors of the system is below either the control threshold depth or below an exit threshold depth and optionally has been for more than a pre-determined time limit (optionally for example 1 minute).

(Wherein the control threshold depth is optionally defined as greater than a shallow depth $D_1$ and less than a threshold wading depth and wherein the exit threshold depth is optionally defined as equal to or less than a shallow depth $D_1$ or alternatively a zero depth.)

Typically in an off-road driving situation, a vehicle 110 will not be travelling on a perfectly level surface. In FIGS. 3a to 3d another situation is depicted. The vehicle 110 with system 180 of the presently described embodiment is depicted travelling down an inclined surface G toward some standing water. Due to the inclined nature of the terrain G upon which the water is standing, the depth of the water increases down the slope, however the surface of the water 130a remains approximately level. With reference to the situation illustrated in FIGS. 3a to 3d optional additional operation of the system 180 of the present embodiment is described over time:

In FIG. 3a, the system is provided with the following data:
- sensor 116a: surface detected at distance less than but very close to ground level;
- sensor 116b: surface detected at distance less than but very close to ground level;
- sensor 114: surface detected at distance G2 which is less than the distance to the ground level G2, at a depth D1 and the sensor 114 is not in contact with water;
- sensor 115: surface level detected matches distance to ground and sensor not in contact with water;
- Attitude sensor: vehicle 110 at inclined angle α, nose down;

During the time period shown in FIG. 3a, the system 180 is provided with the above listed data and data regarding the direction of vehicle travel and attitude and the system 180 is configured to determine that the vehicle 110 is travelling down an inclined surface of angle α; the front end of the vehicle 110 is partially disposed in shallow water of depth D1 at sensor 114, whereas the rear-end of the vehicle 110 is out of the water; and that the vehicle 110 may be entering into deeper water because of the inclination of the surface G. Monitoring of the vehicle 110 and environment continues.

During the time period shown in FIG. 3b, the system 180 is provided with the following data:
- sensor 116a: surface detected at distance less than but close to ground level G;
- sensor 116b: surface detected at distance less than but close to ground level G;
- sensor 114: surface detected at distance G2 less than ground level G, at a depth D2 and sensor 114 is not in contact with water;
- sensor 115: surface level detected matches distance to ground and sensor 115 is not in contact with water;
- Attitude sensor: vehicle at inclined angle α, nose down;
- Ride Height: Normal (RH0);

During the time period shown in FIG. 3b, water has been detected at the control threshold depth; the vehicle 110 is in a "nose down" attitude at angle α travelling forwards and has travelled into deeper water. The system 180 knows this because the system 180 is configured to store data from one or more immediately preceding time intervals relating to: detected water, surface ranges, vehicle speed, drive direction, ride height and attitude and other data as supplied to it from the vehicle sensors and control systems. The system 180 is therefore configured to make a positive determination: determining at this point that there is a possibility that the vehicle 110 will enter into deeper water. The system 180 is configured to take at least one appropriate pre-emptive action upon or shortly after making this determination in order to protect the vehicle 110 and prepare the vehicle 110 for wading (for example: suspend start-stop mode; or activate internal combustion engine if off; and/or increase vehicle ride-height).

In FIG. 3c, the vehicle 110 is illustrated wherein the vehicle 110 ride-height has been raised from normal ride height RH0 to increased ride height RH1 as shown. The ride height is optionally raised automatically by the system 180, optionally, the system 180 may issue a command signal directly to a suspension system controller to cause ride height adjustment. The system 180 is provided with the new ride height data and thereafter the system 180 uses an algorithm for calculating/estimating the water depth based upon the TOF of a signal emitted from and received by the sensors 114, 116a, 116b that is appropriate given the current ride height (and attitude a). Water at the threshold depth D2 is still therefore detected by the under-body downward facing remote sensor 114.

In FIG. 3d, the vehicle in increased ride height RH1 as travelled even further into the water, the system 180 is provided with the following data:
- sensor 116a: surface detected at distance G1, less than the distance to the ground level G, at depth D3 above ground level G;
- sensor 116b: surface detected at distance G1, less than the distance to the ground level at depth D3 above ground level G;
- sensor 114: water detected in contact with sensor 114 and relative height of sensor 114 is known (therefore a minimum water depth at sensor 114 is known);

sensor 140: surface detected beneath sensor 140 at a distance d from the sensor, relative height of sensor 140 known and therefore system 180 can derive that the detected surface is at a height D4 above ground level G;

sensor 115: surface level detected matches distance to ground G and sensor 115 not in contact with water;

Attitude sensor: vehicle at inclined angle α, nose down;

Ride Height: Increased (RH1).

At the instant shown in FIG. 3*d*, the presence of water at wading depth is detected, the vehicle 110 has already been prepared for wading and although the majority of the vehicle 110 is not in the water, vehicle 110 operations and/or functions have been controlled and operated and optionally the driver alerted (via an in-cabin HMI device such as an information screen and/or audible warning). The vehicle 110 therefore proceeds into the water at wading depth in a state optimised for wading. Furthermore, the driver may be better prepared and may be advised of information earlier than would otherwise have been the case if the system 180 awaited the detection of water by a contact sensor disposed on the vehicle body 111 before taking any action. Indeed, due to the increase in the ride-height (RH1) of the vehicle 110, the water level relative to the vehicle 110 may not reach a maximum wading depth of the vehicle 110.

It can be appreciated that various changes may be made within the scope of the present invention, for example, in other embodiments of the invention it is envisaged that the determination of the possibility that the vehicle may be about to enter into water of a sufficient depth that precautions should be taken (also referred to herein as a "positive determination") may depend upon a number of factors based upon the amount of information available to the system and the nature of that information. It is envisaged that in some embodiments, the system makes a positive determination that is not based upon detection of water by at least one remote sensor at a threshold depth. Rather, in certain embodiments, it is envisaged that a "positive determination" may be made based upon for example:

the navigation system indicating water ahead; and/or the vehicle being in OFF-ROAD mode; and/or the vehicle drive speed being low (optionally for example less than about 8 kph); and/or the vehicle being in 4WD mode; and/or at least one water sensor detecting at least shallow water.

In other embodiments a positive determination does depend upon detecting water at control threshold depth. In yet further embodiments of the system, in some situations a positive determination may be made based on detection of water at the threshold depth and in some situations a positive determination may be made irrespective of whether water at a threshold depth has been detected.

For example, if a driver has selected off-road mode that may be sufficient for the system to make a positive determination that there is a possibility of the vehicle entering into a wading event and automatically cause the start-stop engine fuel saving mode to be suspended.

In some envisaged embodiments, in response to the system making a positive determination, the control unit may automatically check the condition of the vehicle and in response thereto may automatically change the vehicle condition by activating, suspending or deactivating one or more vehicle operations or vehicle functions. Alternatively, in other embodiments, the control unit may alert and advise the driver to change the vehicle condition. In some embodiments it is envisaged that it may be a user selectable preference whether the system performs certain pre-emptive and protective measures automatically or only provides a warning alert or other suitable indication for the driver. As such a vehicle may effectively be provided with more than one system according to the invention.

Furthermore it will be realised that the performance of certain functions may be more important than certain other functions and when the system makes a positive determination higher priority actions may be taken first and other lower priority pre-emptive actions may be made afterwards. Indeed the system may be equipped with more than one control threshold depth level at a first (shallower) one of which certain high-priority control actions are taken and then at a second (deeper) one of which certain other lower-priority actions are taken. Based on actuation time for the action and/or the associated risk of not completing the action within time.

It is envisaged that in the various embodiments of the system the at least one pre-emptive action may include any one or a combination of the following control operations in this or in any other appropriate hierarchical order:

suspending engine start-stop mode in hybrid vehicle;

switching on the internal combustion engine (optionally if hybrid vehicle is being powered solely by an electric motor);

recharging the compressed air supply for air suspension system (so that ride height can be adjusted);

adjusting (preferably increasing) the ride height of the vehicle;

initiating 4WD transmission mode;

prepare the vehicle for preventing ingress of water via tail pipe (optionally this may comprise: increasing the pressure in tail pipe to mitigate against or prevent ingress of water via tail pipe optionally by increasing emissions gas flow-rate optionally by increasing engine idle speed; activating a mechanism to increase the height of the tailpipe exhaust outlet; switching a hybrid vehicle to electric drive mode only and sealing the tailpipe exhaust outlet; and selecting an elevated tailpipe routing if available);

change of traction mode;

change of throttle mapping;

change of gear selection mode;

change of high/low range mode;

activate headlights;

select higher air intake path;

adapt tyre pressures to be optimised for wading;

change steering response/feel;

change differential control;

change torque-vectoring control;

change hybrid vehicle drive mode;

activate heating, ventilation and air conditioning system (HVAC);

delay regeneration of exhaust particle filter;

unlock one or more door locks;

open one or more windows;

open sun roof;

activate hydraulic lock sensor of engine;

suspend cooling fan operation; and automatically select low-ratio mode on transfer case (if functionality available).

Furthermore in envisaged embodiments, any or each of the remote and/or contact sensors may be operated intermittently or continuously. The data received by the control unit of the system may be time-averaged and then analysed in order to make a determination as to whether the vehicle may be about to enter into a wading event.

In some envisaged embodiments, the system comprises at least one under body mounted water detection contact sensor.

Optionally such an under-body mounted water detection contact sensor in some envisaged embodiments is positioned on one or more of the following components, but not limited to: front subframe; radiator support pack; bumper beam; wheel arch liner; suspension knuckle; lower arms; spare wheel cradle or other similar component. Advantageously, such components are less prone to interference or erroneous water level measurement since they are at least partially shielded from splashing and/or precipitation. Sensors placed on these locations may provide more reliable measurements of the depth of the water being waded through than a remote sensor.

In envisaged embodiments, the contact sensor(s) may be a capacitive or resistive sensor whereby the capacitance or resistance changes significantly in the presence of water (such as sensors described in WO/2012/080439 (PCT/EP2011/072988) to the present applicant, which is incorporated herein by reference).

Optionally one or more contact sensor(s) may be under-body mounted and may be ultrasonic sensor (such as a Parking Distance Control sensor), submersion in water of which causes a measurable change in the behaviour of the water submersion sensor. The measurable change in behaviour may be identified by a control unit of the system which is configured to monitor data signals issued to it by the water submersion sensor and used by the control unit, (optionally along with other data received by it), to determine that the vehicle is in water of a depth relative to the mounting position of the PDC. This determination is optionally made before the vehicle enters a wading situation and optionally before the water reaches a sufficient depth that ingress of water via the tail pipe of the vehicle is likely. Alternatively or additionally, the contact sensor may be an hydrostatic pressure sensor such as that described in WO/2012/080432 (PCT/EP2011/072991) to the present applicant, which is incorporated herein by reference).

In other envisaged embodiments, the system does not comprise any contact water detection sensors, but rather only remote water detection sensors.

Embodiments of the invention may optionally use sensor(s) that have the ability to detect the surface air/water interface and the lower water/ground interface, for example acoustic, ultrasonic, sonar and ground probing radar sensors, may also be used to measure the depth of the water before or during vehicle passage through water and provide the necessary information to assist the preparation of the vehicle for progression through water.

Envisaged embodiments of the invention optionally use remote and/or contact sensors that have the ability to measure dielectric constant, either by remote or direct means may also be used. The dielectric constant of water is approximately 80. Measurement may be made either by direct contact with the water by means such as a probe, and remote measurement may be made by interrogating the complex (amplitude and phase) returns of energy reflected from the water target. Energy may be transmitted toward the water, optionally ahead of the vehicle, with due regard to the effects of grazing angle, and the scattered complex return signal analysed to determine the dielectric constant of the target.

In embodiments comprising at least one remote sensor, the or each remote sensor may be of any suitable kind. For example the sensor may emit and receive a wave, where propagation and/or reflection speed, amplitude or phase is different in water than in air. Additionally or alternatively, in embodiments where at least one contact sensor is provided, the contact sensor may have a diaphragm or the like the physical characteristics of which are affected in a measurable way because of contact, by immersion, with water.

In envisaged embodiments, a downwardly oriented ultrasound transducer or other suitable ranging sensor can be used to remotely detect a distance between that sensor and the ground upon which the vehicle is travelling. If water (or another reflective surface) intersects the path of the ultrasound pulse between the sensor and ground level, this can be determined from a reduced range measurement derived from the sensor data. (The time of flight of the ultrasonic pulse will be reduced because the path length of the ultrasonic pulse will be reduced because of the presence of water. Dividing the time of flight by two and multiplying by the longitudinal velocity of ultrasound in air will give an estimation of the distance between the sensor and the reflecting surface. If this distance (also referred to as target range) is less than the known distance between the sensor and ground level (optionally including a tolerance for grazing angle and vehicle attitude for more accurate depth estimation) then a determination can be made that the vehicle is partly disposed in water or that water exists ahead of the vehicle line of travel. The confidence of this determination can be increased by comparing similar measurements from two or more sensors. Of particular benefit is the comparison of the target range measurements derived from sensors on different sides (left and right) of the vehicle and at different heights (for example under body and wing mirror).

The sensor may be an optical sensor arranged to be sensitive to a change in the refractive index of the medium in contact with the sensor. This medium would typically be air for normal driving conditions but would be water when the vehicle is wading or is about to be wading.

In envisaged embodiments, optionally one or more sensors of the system is adapted to generate a signal, indicative of control threshold depth; vehicle wading depth; and not wading. The signal may be used to alert the driver, for example by illuminating a warning lamp, displaying a message or generating a tone. This signal may be binary, indicative of the sensor being in contact with water or not, or may comprise a range of outputs indicative of the depth of the water through which the vehicle is travelling.

The system and the sensors comprised in the system are optionally continuously active when the vehicle electrical system is activated (typically when the vehicle ignition key is 'on'), but may be de-activated and re-activated on demand by the vehicle driver. Alternatively, the sensors of the system may be intermittently active. Additionally or alternatively, data from each of any of the sensors may be stored and analysed over time to improve the confidence with which the system determines that a vehicle is possibly going to enter in a wading event.

The contact sensors of the system may be mounted at any suitable location to the underside of the vehicle, in particular on or adjacent a vehicle exhaust tailpipe, on or adjacent an exhaust particle filter, or on or adjacent an under-body mounted battery pack or fuel tank. These locations are low and are thus likely to be in early direct contact with water at wading depth. The battery pack may be a motive power source of a hybrid vehicle.

In one embodiment a vehicle may have a single remote sensor of the kind noted above. However more than one such remote and/or contact sensors may be provided for use by the system in making a positive determination when going forward and when going backwards. For this purpose the sensors will be optionally adjacent the vehicle front and rear extremities. Similarly sensors may be provided at either side of the vehicle (such as mounted in the wing mirrors).

In a further embodiment the system may comprise an on-board wading depth indicator having an output to indicate wading depth to the driver by any suitable means.

In yet a further envisaged embodiment the system for detecting a possibility of wading comprises a plurality of sensors configured to detect a change in the medium in contact therewith and arranged on a vehicle at successively higher locations.

In further embodiments, the system may be utilized to
- disable an engine stop/start system, otherwise provided to improve vehicle fuel economy;
- start an internal combustion engine;
- suspend regeneration of an exhaust particulate filter;
- to engage a special vehicle program adapted to wading, such as all wheel drive;
- limit vehicle speed and/or engage an appropriate gear ratio in the vehicle transmission; and/or
- change view displayed on a driver visible HMI to aid the driver in gauging the depth of and negotiating the water obstacle.

The system may monitor the sensor(s) signal overtime to distinguish from splashing. Any suitable time-averaging functions may be used to filter data signals received from the or each sensor of the system The system may have memory for storing historical data for reference in reaching a positive determination.

In a further embodiment, a vehicle having a system for detecting wading and/or the possibility of wading comprises a sensor and further comprises a powertrain and a powertrain controller arranged to control said powertrain in dependence on detection of the possibility of a wading event.

In a further embodiment, a vehicle having a system for detecting wading and/or the possibility of wading comprises a sensor and further comprises a chassis and a chassis controller arranged to control said chassis in dependence on detection of the possibility of a wading event.

Other advantages will be apparent to one skilled in the art and the present examples and embodiments are to be considered illustrative and not restrictive. The invention is not to be limited to the details given herein, but may be modified within the scope and equivalence of the appended claims.

This application claims priority from UK patent applications nos. GB1104367.6 filed 15 Mar. 2011, GB1114124.9 filed 17 Aug. 2011, and GB1202617.5, filed 15 Feb. 2012, the entire contents of each of which are expressly incorporated by reference herein.

The invention claimed is:

1. A system for determining that there is a possibility that a land vehicle is about to travel through water at a vehicle wading depth wherein an exhaust tailpipe of the vehicle is submerged in water, the system comprising:
at least one remote sensor configured to remotely detect the presence of water about or ahead of the vehicle at a control threshold depth, wherein said control threshold depth is below said wading depth and said exhaust tailpipe is not submerged in water at said control threshold depth; and
a controller configured to, in response to said determining, implement one or more vehicle control strategies in dependence on said detection of the presence of water at said control threshold depth.

2. A system according to claim 1 wherein determining that there is a possibility that a land vehicle is about to travel through water at said vehicle wading depth comprises the system being configured to determine one or more of: a possibility that the vehicle is about to enter water of at least 200 mm in depth and that the vehicle body is about to be at least partially immersed in water; and in response to said determining the system is configured to implement one or more vehicle control strategies before the vehicle enters into water of at least 200 mm in depth and/or before the vehicle body is at least partially immersed in water.

3. A system according to claim 1 wherein said at least one remote sensor(s) comprises at least one ultrasonic transducer sensor.

4. A system according to claim 1 wherein the at least one remote sensor is configured to remotely detect the presence of water, by the sensor emitting a signal and by the same or another sensor receiving a reflection of that signal, and by the system being configured to analyze the reflected signal.

5. A system according to claim 4 wherein the system is configured to analyze the reflected signal by interrogating the amplitude and/or phase of the reflected signal and the presence of water is determined by the system identifying a defined change in the amplitude and/or phase of the reflected signal.

6. A system according to claim 5 wherein the defined change is indicative of a change in the dielectric constant of the medium from which the emitted signal was reflected.

7. A system according to claim 1 wherein the control threshold depth is between 100 mm and 200 mm.

8. A system according to claim 1 wherein the at least one remote sensor is configured to determine one of a depth of the water relative to the vehicle and an absolute depth of the water.

9. A system according to any claim 1 wherein said one or more vehicle control strategies comprises any one or more of:
(i) suspending a stop/start function of a powertrain to prevent automatic shut down of a combustion engine;
(ii) activating a stopped combustion engine;
(iii) preparing an actuator of a ride height adjustment mechanism so that ride height can be adjusted;
(iv) increasing the ride height of the vehicle;
(v) initiating 4WD transmission mode;
(vi) selecting low-range on a transfer box; and
(vii) preparing the vehicle for preventing ingress of water via the vehicle tail pipe by increasing the exhaust gas pressure or flow rate in the tail pipe to mitigate against or prevent ingress of water via the tail pipe.

10. A vehicle comprising a system according to claim 9.

11. A vehicle according to claim 10 wherein the system comprises at least two remote sensors disposed on either side of the vehicle.

12. A vehicle according to claim 11 wherein the system comprises a first remote sensor located on a left side mirror of the vehicle and a second remote sensor located on a right side mirror of the vehicle.

13. A system as claimed in claim 11, wherein the at least two remote sensors are disposed on a common lateral axis of the vehicle.

14. A system according to claim 1 wherein the control strategy comprises preparing the vehicle for preventing ingress of water via the vehicle tail pipe by any one or more of: increasing the exhaust gas pressure by increasing engine speed; activating a mechanism to increase the height of the tailpipe exhaust outlet; and switching a hybrid vehicle to electric drive mode only and sealing the tailpipe exhaust outlet.

15. A vehicle comprising a system according to claim 1.

16. A system as claimed in claim 1, further comprising at least one contact sensor configured to detect the presence of water by the sensor being in contact with the water.

17. A system as claimed in claim 1, wherein the control threshold depth is at least 20 mm below the opening of the exhaust tailpipe outlet.

18. A system for controlling a land vehicle having a combustion engine, the system comprising:
- at least one sensor located on each of two side mirrors arranged on opposite sides of a vehicle, said sensors configured to remotely and/or directly detect the presence of water substantially below and/or about the sensor at a control threshold depth, wherein said control threshold depth is a water depth below an exhaust tailpipe of the vehicle; and
- a controller configured to, in dependence on said detection of the presence of water at said control threshold depth, suspend a stop/start function of the vehicle so as to prevent automatic shut down of the combustion engine.

19. A vehicle comprising two side mirrors, a combustion engine, and a system according to claim 18.

20. A method of determining that there is a possibility that the vehicle is about to travel through water at a vehicle wading depth, wherein an exhaust tailpipe of the vehicle is submerged in water, and controlling a vehicle in response thereto, the method comprising:
- (i) using at least one remote sensor configured to remotely detect the presence of water about or ahead of the vehicle at a control threshold depth wherein said control threshold depth is below the wading depth and said exhaust tailpipe is not submerged in water at said control threshold depth; and in response thereto:
- (ii) determining that there is a possibility that the vehicle is about to enter water at said vehicle wading depth; and
- (iii) implementing one or more vehicle control strategies.

21. A method according to claim 20 wherein when it is determined that there is a possibility that the vehicle is about to enter water at said vehicle wading depth, the step of implementing one or more vehicle control strategies is carried out before the vehicle enters water at said wading depth.

22. A method according to claim 20 wherein said one or more vehicle control strategies comprises any one or more of:
- (i) suspending a stop/start function of a powertrain to prevent automatic shut down of a combustion engine;
- (ii) activating a stopped combustion engine;
- (iii) preparing an actuator of a ride height adjustment mechanism so that ride height can be adjusted;
- (iv) increasing the ride height of the vehicle;
- (v) initiating 4WD transmission mode;
- (vi) selecting low-range on a transfer box; and
- (vii) preparing the vehicle for preventing ingress of water via the vehicle tail pipe by increasing the exhaust gas pressure or flow rate in the tail pipe to mitigate against or prevent ingress of water via the tail pipe.

23. A non-transitory computer readable medium having a computer program stored thereon for implementing the method of claim 20.

* * * * *